United States Patent [19]

Homma et al.

[11] Patent Number: 5,100,713
[45] Date of Patent: Mar. 31, 1992

[54] REINFORCING WOVEN FABRIC AND PREFORMED MATERIAL, FIBER REINFORCED COMPOSITE MATERIAL AND BEAM USING IT

[75] Inventors: Kiyoshi Homma, Oumihachiman; Akira Nishimura, Otsu, both of Japan

[73] Assignee: Toray Industries, Inc., Tokyo, Japan

[21] Appl. No.: 532,678

[22] Filed: Jun. 4, 1990

[30] Foreign Application Priority Data

Jun. 6, 1989 [JP] Japan ................... 1-143870

[51] Int. Cl.[5] ................... B32B 3/06; B32B 5/12; B32B 7/00; D03D 23/00
[52] U.S. Cl. ................... 428/102; 139/383 R; 139/384 R; 139/408; 428/112; 428/113; 428/170; 428/171; 428/198; 428/218; 428/222; 428/245; 428/246; 428/257; 428/258; 428/263; 428/294; 428/301; 428/302; 428/408; 428/902
[58] Field of Search ............... 428/257, 246, 408, 902, 428/224, 225, 102, 112, 113, 170, 171, 198, 218, 222, 245, 258, 263, 294, 301, 302; 139/383 R, 384 R, 408, 416, 417

[56] References Cited

U.S. PATENT DOCUMENTS

| | | | |
|---|---|---|---|
| 4,020,202 | 4/1977 | Kreft | 428/33 |
| 4,177,306 | 12/1979 | Schulz et al. | 428/107 |
| 4,320,160 | 3/1982 | Nishimura et al. | 428/107 |
| 4,354,532 | 10/1982 | Tsubata | 139/416 |
| 4,410,577 | 10/1983 | Palmer et al. | 428/257 |
| 4,622,254 | 11/1986 | Nishimura et al. | 428/102 |
| 4,750,529 | 6/1988 | Watanabe | 139/383 R |
| 4,782,864 | 11/1988 | Abildskov | 139/384 R |
| 4,786,541 | 11/1988 | Nishimura et al. | 428/246 |
| 4,906,506 | 3/1990 | Nishimura et al. | 428/257 |

FOREIGN PATENT DOCUMENTS 0272083 6/1988 European Pat. Off. .

OTHER PUBLICATIONS

Note: U.S. Pat. 4,906,506 is equivalent to EP 02720836 submitted as prior art by the applicants.

*Primary Examiner*—George F. Lesmes
*Assistant Examiner*—James D. Withers
*Attorney, Agent, or Firm*—Birch, Stewart, Kolasch & Birch

[57] ABSTRACT

A reinforcing woven fabric comprising warps of reinforcing filamentary yarns arranged to form a high-density portion of warps and low-density portion of warps in the transverse direction and wefts of reinforcing filamentary yarns extending obliquely to the warps, a preformed material formed using a plurality of the reinforcing woven fabrics, a fiber reinforced composite material formed using the preformed material and a beam particularly suitable as the fiber reinforced composite material. The high-density portion of warps in the reinforcing woven fabric can satisfy the strength and rigidity against bending or tensile stress required for the flange of the beam and the obliquely extending wefts in the low-density portion of warps can satisfy the strength against shear stress required for the web of the beam, when a plurality of the reinforcing woven fabrics are laminated to form the preformed material for the beam. The mechanical properties required for the beam can be efficiently obtained.

74 Claims, 13 Drawing Sheets

REINFORCING WOVEN FABRIC AND PREFORMED MATERIAL, FIBER REINFORCED COMPOSITE MATERIAL AND BEAM USING IT

BACKGROUND OF THE INVENTION

1. Field of the Invention

The present invention relates to a reinforcing woven fabric for use in fiber reinforced composite materials such as fiber reinforced plastics (hereinafter referred to as FRP), fiber reinforced carbons (hereinafter referred to as FRC) and fiber reinforced metals (hereinafter referred to as FRM), and to a preformed material which is an intermediate substrate for molding such composite materials, a fiber reinforced composite material molded with the preformed material and a beam molded with the preformed material.

2. Description of the Prior Art

Reinforcing filamentary yarns are often used as a formation of a woven fabric where a fiber reinforced composite material is molded. For example, such a reinforcing woven fabric for an FRP beam is disclosed in JP-B-SHO-62-23139. The reinforcing woven fabric is constituted by an ordinary biaxially woven fabric wherein the size and density of warps and wefts are both equal to each other and the warps and the wefts cross each other at a right angle. A plurality of the reinforcing woven fabrics are laminated such that the warps or the wefts of the reinforcing woven fabrics extend in the directions having angles of ±45° relative to the longitudinal direction of the beam in the web portion of the beam (hereinafter, this laminated layer is called "±45° layer".). In the flange portion of the beam, some group of the end portions of the laminated reinforcing woven fabrics, and the other are separated in opposite directions to form the flange portion, and a single or a plurality of the reinforcing woven fabrics are laminated on the surface of the separated end portions such that the warps or the wefts of the single or the plurality of the reinforcing woven fabrics extend in the longitudinal direction of the beam (hereinafter, this laminated layer is called "0° layer".). A reason why the web portion is constructed of ±45° layer is that such a layer is effective to resist a shear stress generated in the beam. A reason why 0° layer is provided in the flange portion is because the strength and rigidity in the longitudinal direction of the beam are insufficient if only ±45° layer is provided.

In such a lamination structure, however, since a boundary is present between ±45° layer and 0° layer in the flange portion, there occurs a problem that the laminated layers are liable to delaminate at the boundary. Moreover, it is troublesome to provide the 0° layer additionally.

U.S. Pat. No. 4,177,306 discloses a laminated sectional girder having a web and a flange wherein ±45° layer in the web is molded with unidirectional prepregs and 0° layer in the flange is formed by extending the unidirectional prepregs to the flange portion and interposing additional unidirectional prepregs between the extended unidirectional prepregs. However, this has the same problem as that on the beam disclosed in JP-B-SHO-62-23139.

SUMMARY OF THE INVENTION

An object of the present invention is to provide a reinforcing woven fabric which, when a plurality of the reinforcing woven fabrics are used for molding a beam of a fiber reinforced composite material, is able to form the ±45° layer in the web of the beam and the 0° layer in the flange of the beam at the same time and prevent the delamination at the boundary between layers in the beam.

Another object of the present invention is to provide a preformed material for use in fiber reinforced composite materials, particularly suitable to use for molding the beam.

A further object of the present invention is to provide a fiber reinforced composite material comprising the preformed material and suitable for use in a formation of the beam.

A still further object of the present invention is to provide the beam constructed from the fiber reinforced composite material which can be molded relatively easily and prevent the delamination at the boundary between layers in the beam.

To achieve these objects, the present invention provides herein a reinforcing woven fabric and a preformed material, a fiber reinforced composite material and a beam using it.

The reinforcing woven fabric according to the present invention comprises a plurality of warps of reinforcing filamentary yarns extending in the longitudinal direction of the reinforcing woven fabric in parallel to one another in a sheet-like form, the warps being arranged in the transverse direction of the reinforcing woven fabric to form a portion with a high density of the warps and a portion with a low density of the warps; and a plurality of wefts of reinforcing filamentary yarns extending in a direction across the warps and oblique to the direction of the extension of the warps in parallel to one another in a sheet-like form.

The preformed material according to the present invention has a plurality of reinforcing woven fabrics laminated and integrated to each other, each of the reinforcing woven fabrics comprising (a) a plurality of warps of reinforcing filamentary yarns extending in the longitudinal direction of the reinforcing woven fabric in parallel to one another in a sheet-like form, the warps being arranged in the transverse direction of the reinforcing woven fabric to form a portion with a high density of the warps and a portion with a low density of the warps, and (b) a plurality of wefts of reinforcing filamentary yarns extending in a direction across the warps and oblique to the direction of the extension of the warps in parallel to one another in a sheet-like form; the plurality of reinforcing woven fabrics being so laminated that the portions with the high density of the warps of the respective reinforcing woven fabrics are conformed to each other and the portions with the low density of the warps of the respective reinforcing woven fabrics are conformed to each other.

The fiber reinforced composited material according to the present invention includes a preformed material comprised of a plurality of reinforcing woven fabrics laminated and integrated to each other and a matrix containing the plurality of reinforcing woven fabrics, each of the reinforcing woven fabrics comprising (a) a plurality of warps of reinforcing filamentary yarns extending in the longitudinal direction of the reinforcing woven fabric in parallel to one another in a sheet-like form, the warps being arranged in the transverse direction of the reinforcing woven fabric to form a portion with a high density of the warps and a portion with a low density of the warps, and (b) a plurality of wefts of reinforcing filamentary yarns extending in a direction across the warps and oblique to the direction of the extension of the warps in parallel to one another in a sheet-like form; the plurality of reinforcing woven fabrics being so laminated that the portions with the high density of the warps of the respective reinforcing woven fabrics are conformed to each other and the portions with the low density of the warps of the respective reinforcing woven fabrics are conformed to each other.

The beam constructed from a fiber reinforced composite material according to the present invention has a flange and a web, the fiber reinforced composite material including a preformed material comprised of a plurality of reinforcing woven fabrics laminated and integrated to each other and a matrix containing the plurality of reinforcing woven fabrics; each of the reinforcing woven fabrics comprising (a) a plurality of warps of reinforcing filamentary yarns extending in the longitudinal direction of the reinforcing woven fabric in parallel to one another in a sheet-like form, the warps being arranged in the transverse direction of the reinforcing woven fabric to form a portion with a high density of the warps and a portion with a low density of the warps, and (b) a plurality of wefts of reinforcing filamentary yarns extending in a direction across the warps and oblique to the direction of the extension of the warps in parallel to one another in a sheet-like form; the plurality of reinforcing woven fabrics being so laminated that the portions with the high density of the warps of the respective reinforcing woven fabrics are conformed to each other and the portions with the low density of the warps of the respective reinforcing woven fabrics are conformed to each other.

In the present invention, the reinforcing filamentary yarns used for the warps and the wefts are high-strength and high Young's modulus multifilaments composed of at least one member selected from the group consisting of carbon fibers, glass fibers, polyaramide fibers, polyetheretherketone fibers, silicon carbide fibers, alumina fibers and alumina-silica fibers. The yarn material is selected from these fibers depending upon the use of the reinforcing woven fabrics or the kind of a composite material to be molded. When carbon fibers are used for the reinforcing filamentary yarns, high-strength and high Young's modulus carbon fiber multifilaments are preferable which have a tensile strength of not less than 350 kg/mm$^2$ and a tensile Young's modulus of not less than $20 \times 10^3$ kg/mm$^2$ in measurement based on ASTM-D-4018-81 Method 2.

The reinforcing woven fabric according to the present invention has a plurality of warps of reinforcing filamentary yarns extending in the longitudinal direction of the reinforcing woven fabric in parallel to one another in a sheet-like form, and a plurality of wefts of reinforcing filamentary yarns extending in a direction across the warps and oblique to the direction of the extension of the warps in parallel to one another in a sheet-like form.

The weave structure of the reinforcing woven fabric may be a plain weave, twill weave or satin weave structure. Alternatively, the weave structure may be a non-crimp fibrous structure which comprises (a) a yarn group "A" composed of a plurality of straight warp yarns gathered in one direction in parallel to one another in a sheet-like form, (b) a yarn group "B" composed of a plurality of straight weft yarns gathered in one direction in parallel to one another in a sheet-like form, the sheet face of the yarn group "B" confronting the sheet face of the yarn group "A" and the weft yarns intersecting the warp yarns, and (c) auxiliary filamentary yarns holding integrally the yarn groups "A" and "B", as disclosed in U.S. Pat. No. 4,320,160. Where the weave structure is this non-crimp fibrous structure, the auxiliary filamentary yarns are preferably composed of at least one member selected from the group consisting of carbon fibers, glass fibers, polyaramide fibers, rayon fibers, acrylic fibers, polypropylene fibers, polyamide fibers and polyester fibers. The elongation at break of the auxiliary filamentary yarns is preferably not less than 2% and higher than those of both the warps and the wefts. It can be prevented by using such auxiliary filamentary yarns that the auxiliary filamentary yarns break prior to the breakage of the warps or the wefts and the destruction of the weave structure propagates from the broken portion. The warps and wefts preferably are not twisted to increase the impregnation ability of a matrix when a composite material is molded. However, if the twist number of the yarns is less than 15 turns/m, there is no problem.

The wefts extend obliquely to the direction in which the warps extend. It depends upon the use of the reinforcing woven fabric how much the oblique angle is set to. For example, when the reinforcing woven fabric is to be used for molding a beam, the wefts are directed at an angle in the range of $\pm 45° \pm 15°$ or $-45° \pm 15°$, preferably at an angle of just $\pm 45°$ or $-45°$ relative to the direction of the warps.

The reinforcing woven fabric has a portion with a high density of the warps and a portion with a low density of the warps in the transverse direction of the woven fabric. Where, the density of the warps is represented by the product of the size of the single warp (the diameter of a single filament x the number of the filaments constituting the single warp) and the weave density of the warps (the arrangement density of the warps: the number of the warps per unit length). Accordingly, the density of the warps can be changed by changing the size of the warp and/or the weave density of the warps. It is determined depending upon the use of the reinforcing woven fabric or the kind of the reinforcing filamentary yarns by how much degree the density of the portion with a high density of the warps is set higher than the density of the portion with a low density of the warps. For example, when the reinforcing woven fabric is used for molding a beam described later, the high-density portion preferably has a density of at least three times that of the low-density portion.

The portion with a high density of the warps may be positioned at any portion in the transverse direction of the reinforcing woven fabric as required. Namely, the portion may be positioned at, for example, a central portion or an end portion of the woven fabric in the transverse direction. The position of the portion may be determined depending upon the use of the woven fabric. In a case where the reinforcing woven fabric is used for molding a beam having a flange or flanges and a web as described later, the end portion or the end portions of the reinforcing woven fabric corresponding to the flange or the flanges of the beam are formed as the portion or the portions with a high density of the warps.

To increase the density of the warps, basically either the size of the warp or the weave density of the warps or both the size and the weave density may be increased, as aforementioned. Alternatively, as shown in FIGS. 1 and 2, the density of the warps of portions 3 can be increased by double weaving the reinforcing woven fabric comprised of warps 1a and 1b and wefts 2 partially at the portions 3. In the reinforcing woven fabric shown in FIGS. 1 and 2, since the size of warp 1a is larger than the size of warp 1b and the number of warps 1a in double-weave portions 3 is two times the number of warps 1b in central low-density portion 4, the difference of the densities of warps between the high-density portions 3 and the low-density portion 4 can be set to a great difference. The selvages of the reinforcing woven fabric may be formed as binded selvages which are fixed by binding yarns 5 to prevent the selvages from being broken, as shown in FIG. 1.

The kind of the reinforcing filamentary yarns constituting the warps may be changed between the portion with a high density of the warps and the portion with a low density of the warps. For example, carbon fibers may be used for the warps of the high-density portion and glass fibers may be used for the warps of the low-density portion. Thus, to change the kind of the reinforcing filamentary yarns constituting the warps in accordance with the portions of the woven fabric is very advantageous from the viewpoint that the optimum reinforcing filamentary yarns with respect to the required properties for the warps or the portions of the woven fabric can be effectively selected. Further, since some kinds of reinforcing filamentary yarns are expensive, the production cost of the reinforcing woven fabric can be reduced by changing the kind of the warps in the reinforcing woven fabric, for example, by using the yarns composed of carbon fibers in the end portion of the woven fabric when a reinforcing effect is required for the end portion and using cheap yarns comprised of, for example, glass fibers in other portion of the woven fabric.

The warps and the wefts of the reinforcing woven fabric may be fixed to each other by a thermoplastic polymer at their intersections. This fixing can be conducted in such a manner as disclosed in European Patent Publication 272,083, JP-A-SHO-61-34244 or Japanese Utility Model Publication SHO 61-198284, wherein a yarn composed of a theremoplastic polymer having a low melting point such as nylon, copolymerized nylon, polyester, vinylidene chloride or vinyl chloride is supplied together with a warp yarn and/or a weft yarn when the warp yarn and the weft yarn are woven to a reinforcing woven fabric, and after the weaving, the theremoplastic polymer yarn is molten and the warps and the wefts of the reinforcing woven fabric are bonded to each other at their intersections by the molten thermoplastic polymer.

The reinforcing woven fabric may be formed as a prepreg before a preformed material described later is produced. The prepreg is made by providing a substance to be a matrix for fiber reinforced composite materials to the reinforcing woven fabric. The substance to be a matrix for fiber reinforced composite materials can be selected from a resin and a metal. When the matrix is a resin, the resin before being cured may be impregnated into the reinforcing woven fabric. A preferable matrix resin is a thermosetting resin selected from the group consisting of epoxy resins, unsaturated polyester resins and phenolic resins or a thermoplastic resin selected from the group consisting of nylon resins, polyester resins, polybutylene terephthalate resins, bismaleimide resins, polyphenylene sulfide resins and polyetheretherketone resins. When the matrix is a metal, the rigidity of the reinforcing woven fabric becomes too large if the metal is impregnated into the woven fabric in such a manner that a resin is impregnated. Therefore, the reinforcing woven fabric is formed as a prepreg by providing a thin layer of a metal onto the woven fabric by a method such as plating, deposition or sputtering. As the metal, a single metal such as aluminum, magnesium, tin, zinc or copper as well as an alloy having a main component composed of at least one metal selected from these metals can be employed. When the prepreg of the reinforcing woven fabric is made, the warps and the wefts of the woven fabric is desirably fixed as aforementioned. The disarrangement of the reinforcing filamentary yarns of the reinforcing woven fabric can be prevented by the fixing.

The preformed material according to the present invention is made by laminating and integrating a plurality of reinforcing woven fabrics to each other. Of course, when the reinforcing woven fabrics are laminated, the directions of the warps and the wefts and the disposition of the portion with a high density of the warps are determined depending upon the use of the preformed material. The plurality of reinforcing woven fabrics are so laminated that the portions with a high density of the warps of the respective reinforcing woven fabrics are conformed to each other and the portions with a low density of the warps of the respective reinforcing woven fabrics are conformed to each other. Although the preformed material is constituted generally by using only the reinforcing woven fabrics according to the present invention, an ordinary biaxially woven fabric, a mat such as a surface mat or chopped strund mat, or a felt composed of reinforcing filamentary yarns or reinforcing fibers may be disposed between appropriate layers or as an outermost layer. For example, in a case where the reinforcing woven fabrics comprise carbon fibers having a conductivity, substrates having a property of electrical insulation may be laminated on the outermost layers of the laminated reinforcing woven fabrics. When a fiber reinforced composite material is molded using such a preformed material, the composite material can have an electrical-insulation property on its surfaces, thereby preventing the composite material from being suffered from electrocorrosion. Such substrates having an electrical insulation property can be constructed from glass fibers or polyaramide fibers.

The integration of the reinforcing woven fabrics in the formation of the preformed material can be conducted by bonding the woven fabrics by a thermoplastic polymer. In this method, since the impregnation ability of a matrix in the formation of a fiber reinforced composite material deteriorates if the reinforcing woven fabrics are bonded by surface bonding, bonding at points or bonding by lines is desirable. As the thermoplastic polymer for the bonding, the same resins as those used for the fixing of the warps and the wefts aforementioned can be employed. When the reinforcing woven fabrics fixed by a thermoplastic polymer are employed, the thermoplastic polymer can be utilized for integrating the reinforcing woven fabrics to form a preformed material. When the reinforcing woven fabrics are formed as prepregs, the woven fabrics themselves can directly be integrated by the adhesive ability of the prepregs without using additional bonding materials.

The reinforcing woven fabrics can also be integrated by stitching by stitch yarns which are composed of the same kind of reinforcing filamentary yarns as those of the warps or the wefts. In this case, the stitch yarns are inevitably bent greatly, and it is feared that the stress generated in a composite material molded with the preformed material concentrates at the bent portions of the stitch yarns, the stitch yarns break at the portions prior to the breakage of the warps or the wefts and the destruction of the composite material propagates from the portions. Therefore, the reinforcing filamentary yarns constituting stitch yarns are preferably yarns having an elongation at break of not less than 1.5% and higher than those of both the warps and the wefts. The stitching may be conducted either at the same pitch or such that important portions are stitched at a high density.

The stitching by the stitch yarns is preferably conducted by a single chain stitching such that upper yarns and lower yarns are not entangled to each other in the interior of the preformed material. In the single chain stitching, for example, as illustrated in FIG. 3, because the bent portions of stitch yarns 11 are not positioned in the interior of preformed material 12, the stitch yarns are difficult to be broken in the interior of the prefomed material. If the stitch yarns break in the interior of the preformed material, the delamination between the layers of the reinforcing woven fabrics is liable to occur in the composite material molded with the preformed material. However, such a delamination between the layers can be prevented by the application of the single chain stitching. Such a stitching technology is disclosed in detail in U.S. Pat. No. 4,622,254. Furthermore, in the present invention, the bonding by a thermoplastic polymer and the stitching by stitch yarns may be both applied at the same time for integrating a plurality of the reinforcing woven fabric to form a preformed material.

With respect to the lamination structure of a plurality of the reinforcing woven fabrics, the reinforcing woven fabrics preferably are such laminated that the directions of extension of the warps and the wefts of the respective reinforcing woven fabrics are set at mirror symmetry relative to the center surface of lamination of the plurality of reinforcing woven fabrics. The camber or the torsion of a fiber reinforced composite material molded using the preformed material can be prevented by applying such a lamination structure. When the reinforcing woven fabrics are such laminated that the directions of extension of the warps of the respective reinforcing woven fabrics are arranged to the same direction, the strength of the interior of the preformed material can be balanced in any direction in parallel to the surface of the preformed material by setting the laminated reinforcing woven fabrics such that the wefts of different woven fabrics intersect each other and the respective numbers of two groups of wefts extending in different two directions are equal to each other. Even if the plurality of the reinforcing woven fabrics have the same weave structure, such a lamination structure can be easily achieved by turning the surface sides of a half of the reinforcing woven fabrics to be laminated to the back surface sides thereof. Moreover, in the preformed material having such a mirror symmetry lamination structure as described above, preferably the same even number of the reinforcing woven fabrics are laminated from the center surface of the lamination structure in opposite directions, respectively, to ensure the strength balance in the interior of the preformed material more precisely.

The preformed material according to the present invention can be formed as various shapes depending upon the use of the material, such as a plane plate shape, or H shape, I shape, C shape, J shape, L shape, T shape or Z shape in cross section. Such preformed materials according to the present invention are suitable particularly for use in beams. When the preformed material is used for a beam having a flange and a web, preferably the preformed material is such formed and the reinforcing woven fabrics are such laminated that the portions with a high density of the warps of the respective reinforcing woven fabrics are positioned at the flange forming portion of the preformed material, the warps of the respective reinforcing woven fabrics extend in the longitudinal direction of the flange forming portion and the portions with a low density of the warps of the respective reinforcing woven fabrics are positioned at the web forming portion of the preformed material.

Fiber reinforced composite materials according to the present invention can be molded with above-mentioned preformed materials by well-known processes. For example, an FRP can be molded by inserting the preformed material into a mold and injecting a matrix resin into the mold, i.e., so-called injection molding. A preferable matrix resin for the injection molding is a thermosetting resin selected from the group consisting of epoxy resins, unsaturated polyester resins and phenolic resins or a thermoplastic resin selected from the group consisting of nylon resins, polyester resins, polybutylene terephthalate resins, bismaleimide resins, polyphenylene sulfide resins and polyetheretherketone resins. In a case where the reinforcing woven fabrics are formed as prepregs and the preformed material is formed with the prepregs, an FRP can be made by only inserting the preformed material into a mold and pressing the preformed material. Further, in a case where a carbonisable resin such as phenolic resin, furan resin or pitch is used as the matrix resin, FRC can be obtained by calcining the carbonisable resin and converting the resin to carbon, i.e., carbonizing the resin. Furthermore, a metal can be used as a matrix substance to mold a fiber reinforced composite material according to the present invention. For example, an FRM can be obtained by high pressure casting wherein the preformed material is inserted into a mold and a molten metal to be the matrix for the FRM is press fitted into the mold. As the matrix metal of the FRM, a single metal selected from the group consisting of aluminum, magnesium, tin, zinc and copper and an alloy having a main component composed of at least one metal selected from these metals can be both employed.

The preformed material according to the present invention is suitable for, particularly, use in a beam constructed from a fiber reinforced composite material. The beam according to the present invention has a single or a plurality of flanges and webs. The beam includes a preformed material comprised of a plurality of reinforcing woven fabrics laminated and integrated to each other and a matrix containing the reinforcing woven fabrics. As aforementioned, the preformed material is formed such that the portions with a high density of the warps of the respective reinforcing woven fabrics are positioned at the flange forming portion or portions of the preformed material corresponding to the flange or flanges of the beam and the portions with a low density of the warps of the respective reinforcing woven fabrics are positioned at the web forming portion or portions of the preformed material corresponding to the web or webs of the beam.

In the beam according to the present invention, since the flange is efficiently reinforced in strength and rigidity in the longitudinal direction by the warps having the dense arrangement or weave structure and constituting a main part of a 0° layer, the web is efficiently reinforced in strength against the shear stress generated in the beam by the wefts extending obliquely to the warps and constituting a main part of a ±45° layer or the like and both the reinforcements are performed at a time by forming a preformed material by basically only the reinforcing woven fabrics according to the present invention without laminating or inserting additional layers of other reinforcing woven fabrics, the formation of the beam having required mechanical properties can be achieved very easily and the delamination at the boundary between layers in the beam can be effectively prevented.

BRIEF DESCRIPTION OF THE DRAWINGS

The accompanying drawings illustrate several embodiments of the invention and together with the description serve to explain the principles of the invention.

DETAILED DESCRIPTION OF THE PREFERRED EMBODIMENTS

Some preferred embodiments of the present invention will be described hereunder with reference to the attached drawings.

Figure 1:
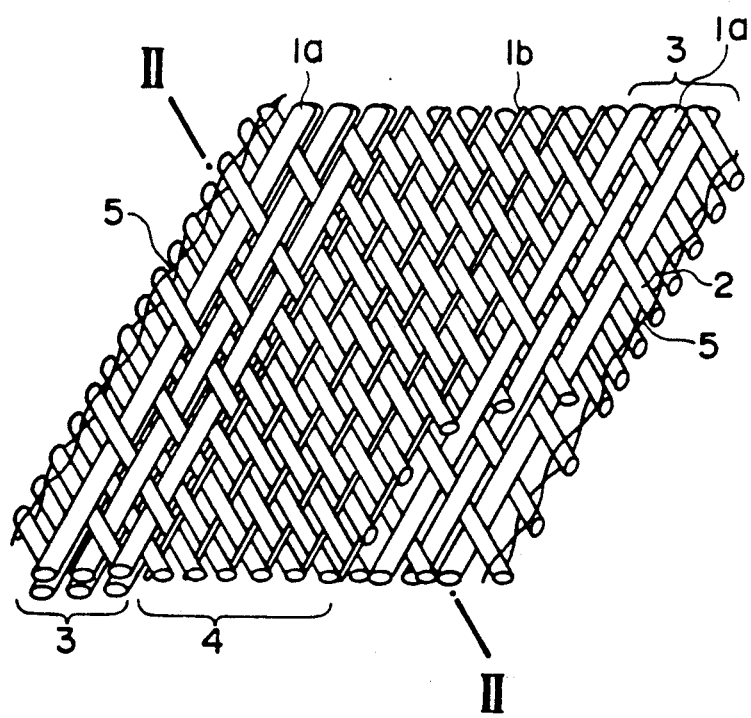
FIG. 1 is a perspective view of a reinforcing woven fabric partially cut away and showing a double weave structure according to the present invention.
Figure 2:
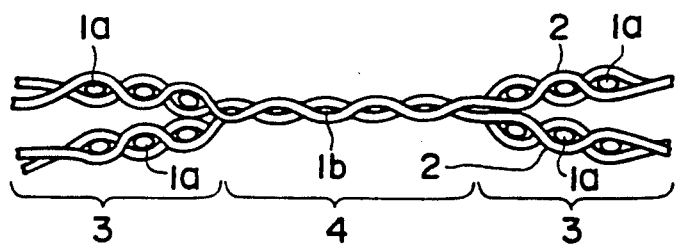
FIG. 2 is a cross-sectional view of the reinforcing woven fabric shown in FIG. 1, taken along II—II line of FIG. 1.
Figure 3:
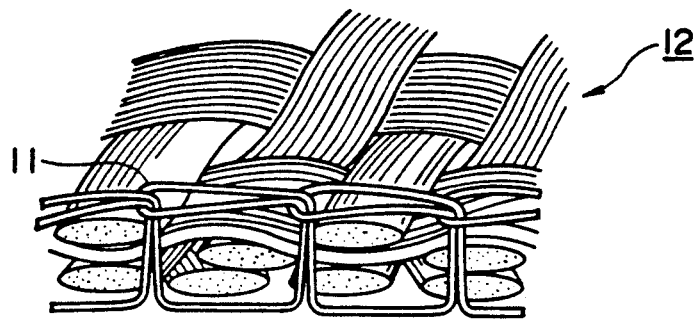
FIG. 3 is a perspective view of a preformed material, showing a single chain stitching structure, wherein its side is taken as the cross section.
Figure 4:
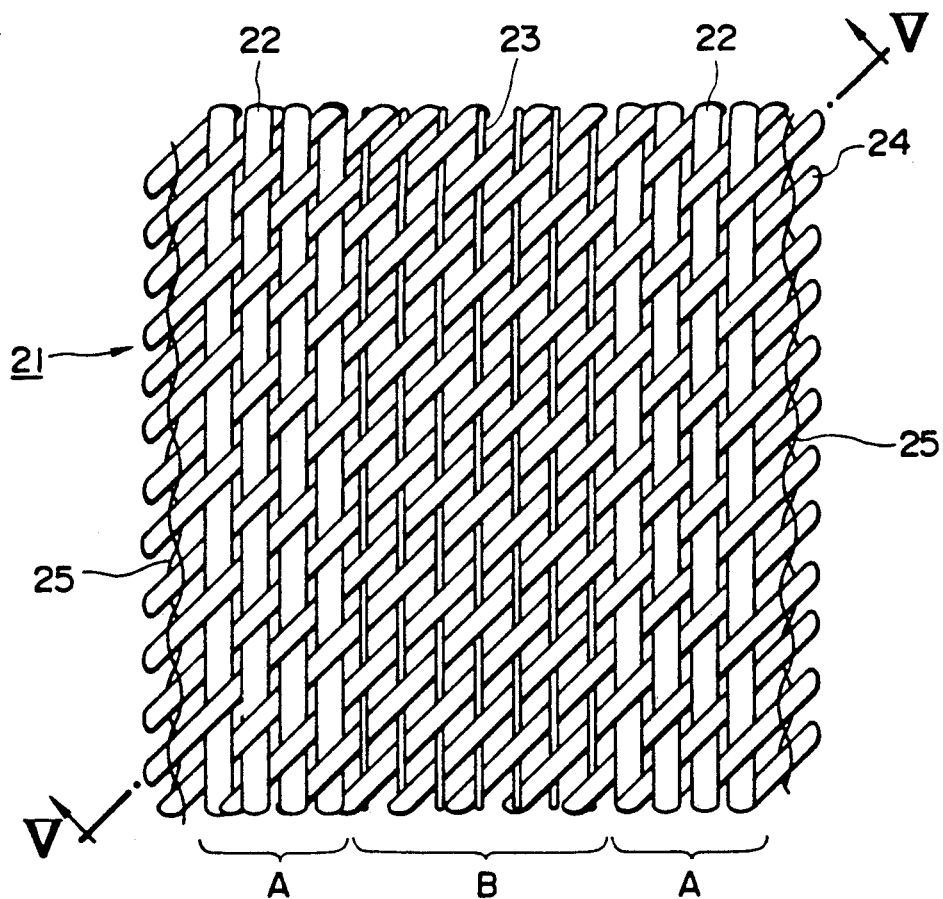
FIG. 4 is a plan view of a reinforcing woven fabric according to a first embodiment of the present invention.
Figure 5:
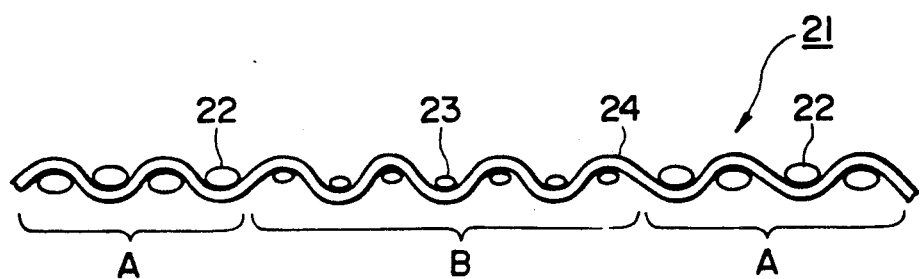
FIG. 5 is a cross-sectional view of the reinforcing woven fabric shown in FIG. 4, taken along V—V line of FIG. 4.

FIG. 4 illustrates a reinforcing woven fabric 21 according to a first embodiment of the present invention. Reinforcing woven fabric 21 is a plain weave comprising a plurality of warps 22 extending in the longitudinal direction of the fabric at both side end portions A and A in parallel to one another and composed of reinforcing filamentary yarns each having a relatively large yarn size, a plurality of warps 23 extending in the same longitudinal direction at a portion B (central portion) other than both side end portions A and A in parallel to one another and composed of reinforcing filamentary yarns each having a relatively small yarn size, and a plurality of wefts 24 extending across warps 22 and 23 at an angle of +45° relative to the longitudinal direction in parallel to one another and composed of reinforcing filamentary yarns. In this embodiment, the reinforcing filamentary yarns of warps 22 and wefts 24 are composed of carbon fibers, and the reinforcing filamentary yarns of warps 23 are composed of glass fibers. As shown also in FIG. 5, portions A and A are portions with a high density of warps, and portion B is a portion with a low density of warps. The selvage portions are constituted as binded selvages binded by binding yarns 25 composed of glass fibers having a small denier to prevent the selvages from being broken.

In this reinforcing woven fabric 21, warps 22 and wefts 24 mainly have the reinforcing function, and warps 23 mainly have a function maintaining the weave structure, although the warps 23 also have the reinforcing function to some extent. If reinforcing woven fabric 21 is turned surface side back, it becomes a reinforcing woven fabric wherein wefts 24 extend obliquely at an angle of −45° relative to warps 22 and 23. Hereinafter, such a reinforcing woven fabric is referred to as a reinforcing woven fabric 21a.

Figure 6:
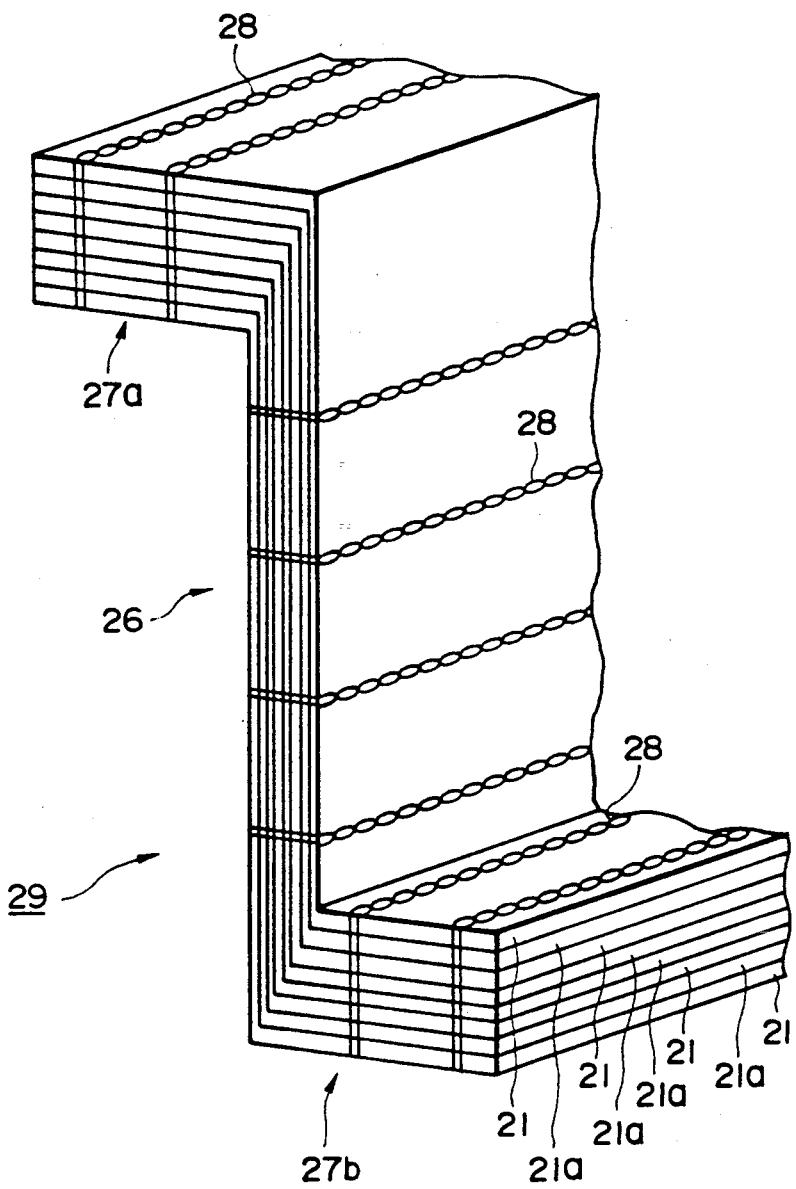
FIG. 6 is a partial perspective view of a preformed material formed with a plurality of the reinforcing woven fabrics shown in FIG. 4.
Figure 7:
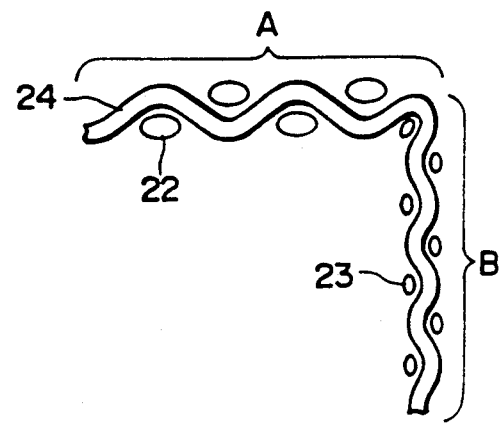
FIG. 7 is an enlarged partial cross-sectional view of a single reinforcing woven fabric of the preformed material shown in FIG. 6.
Figure 8:
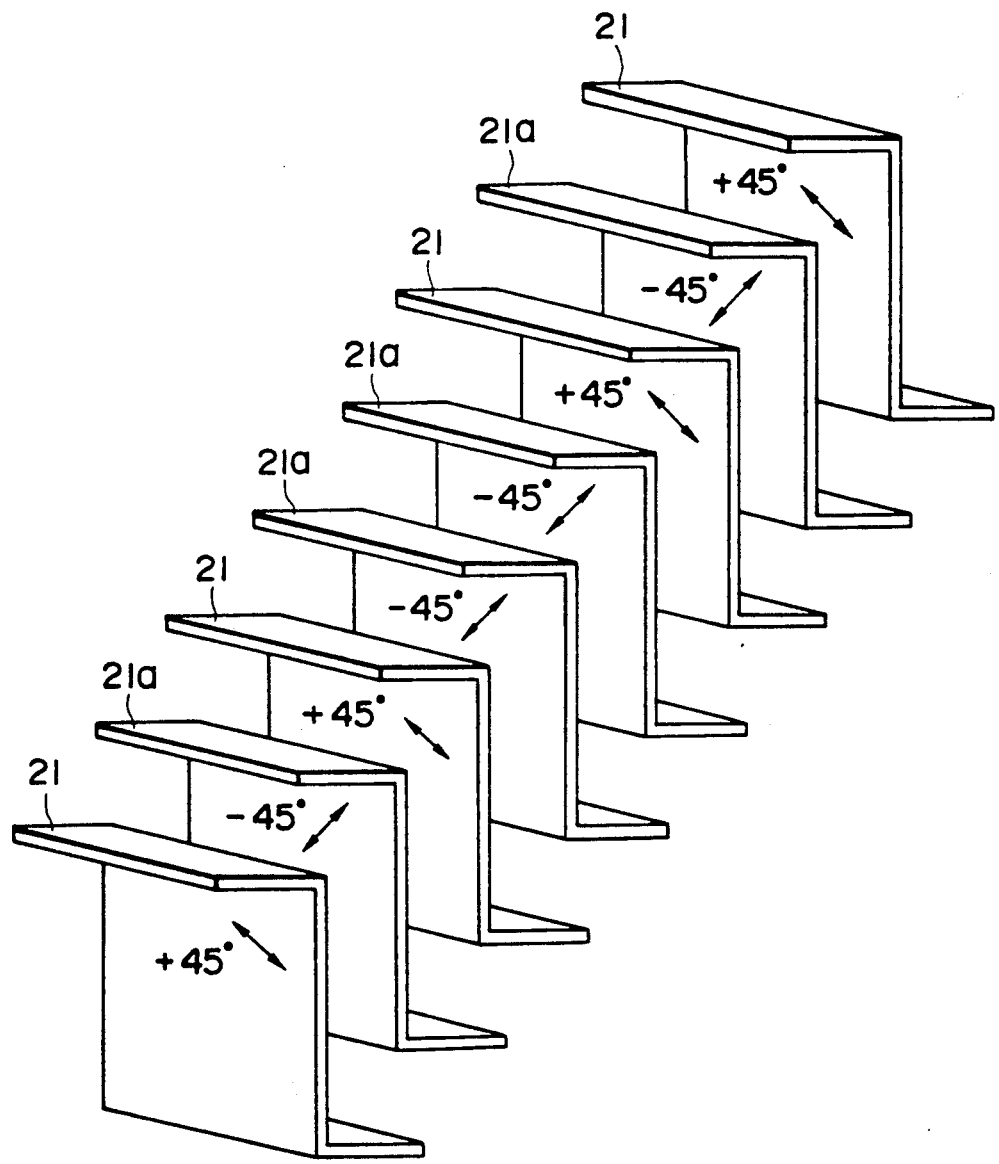
FIG. 8 is an exploded perspective view of the preformed material shown in FIG. 6, showing the lamination structure of the preformed material.

FIG. 6 illustrates a preformed material 29 for molding a Z-shaped beam. The above reinforcing woven fabrics 21 and 21a are laminated and integrated by stitching by stitch yarns 28 in a single chain stitching such that warps 22 and 23 extend in the longitudinal direction of the preformed material (i.e. the longitudinal direction of the beam), the directions of extension of wefts 23 of the respective reinforcing woven fabrics are set at mirror symmetry relative to the center surface of lamination of the reinforcing woven fabrics, portions A and A correspond to the flange forming portions of the preformed material and portion B corresponds to the web forming portion of the preformed material. Namely, as a part of a single layer of the reinforcing woven fabric 21 is shown in FIG. 7, portion A with a high density of warps comprising warps 22 of carbon fibers is positioned at a flange forming portion 27a (27b), and portion B with a low density of warps comprising warps 23 of glass fibers is positioned at web forming portion 26. Accordingly, when a Z-shaped beam is molded using the preformed material 29, wefts 24 having a reinforcing function are arranged in the web of the beam along the directions having angles of ±45° relative to the longitudinal direction of the beam, and warps 22 having a reinforcing function are arranged in the flange of the beam along the longitudinal direction of the beam. In FIG. 8, arrows show the directions of extension of wefts 24. In this beam, the warps 22 mainly support the bending stress generated in the beam, and the wefts 24 mainly support the shear stress generated in the beam. In the preformed material, additional substrates other than the above reinforcing woven fabrics may be provided to prevent the disarrangement of the weave structure of the reinforcing woven fabrics or the bending of the warps or the wefts when the woven fabrics are stitched or to prevent an electrocorrosion of the beam. For example, a scrim cloth composed of glass fibers as an electrical-insulating substrate may be provided on each of the outermost layers of the preformed material to give an electrocorrosion resistance property to the beam to be obtained.

In the formation of such a beam as described above, the reinforcing filamentary yarns in the reinforcing woven fabrics can be arranged at desired portions and along desired directions very easily only by successively laminating the reinforcing woven fabrics. Therefore, not only it is not necessary to form ±45° layers in the web and 0° layers in the flanges separately from each other as described in the Prior Art, but also the delamination between the ±45° layers and the 0° layers can be effectively prevented because the warps having a required function and the wefts having a required function themselves are woven in the same reinforcing woven fabric.

Figure 9:
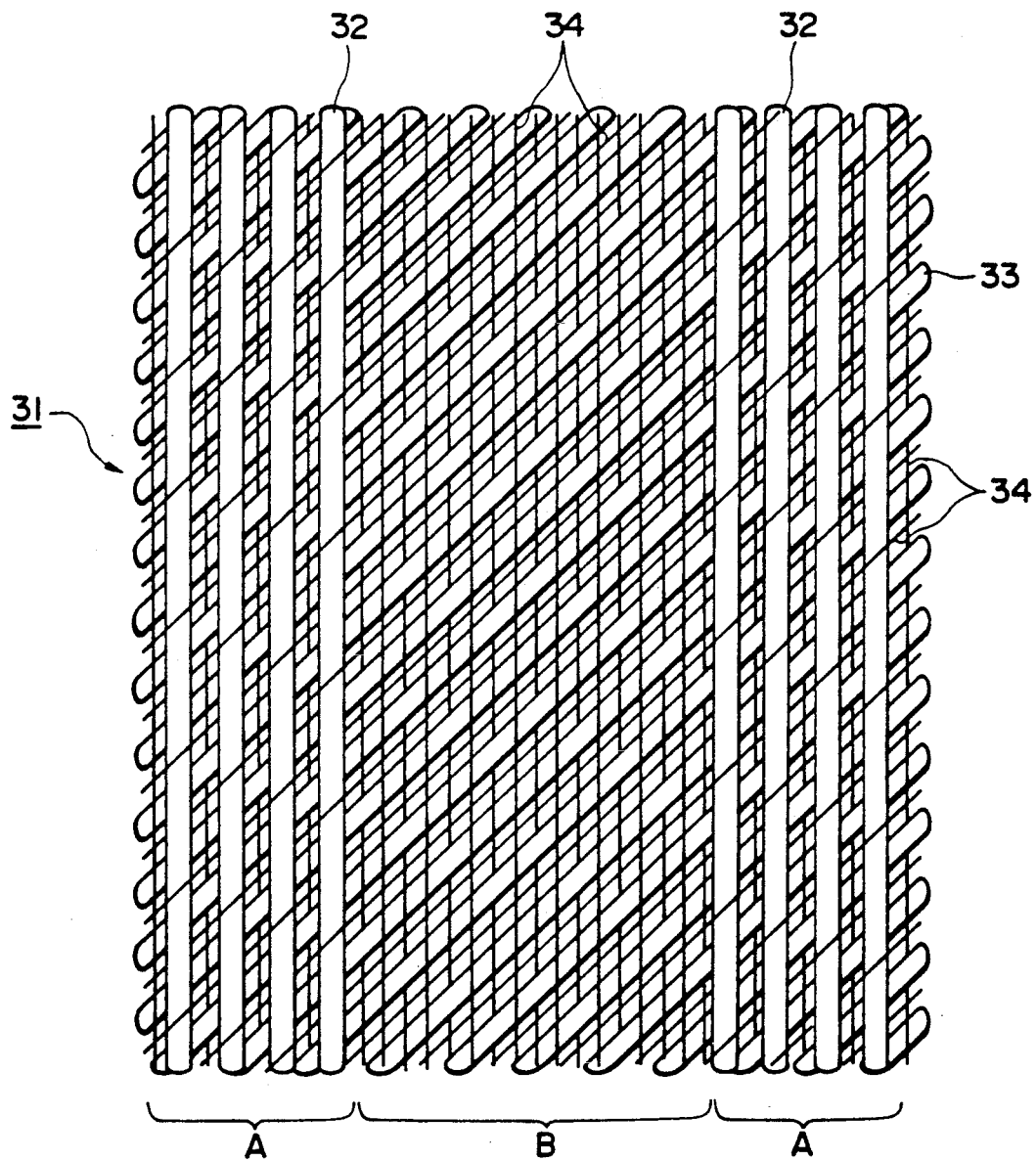
FIG. 9 is a plan view of a reinforcing woven fabric according to a second embodiment of the present invention.
Figure 10:
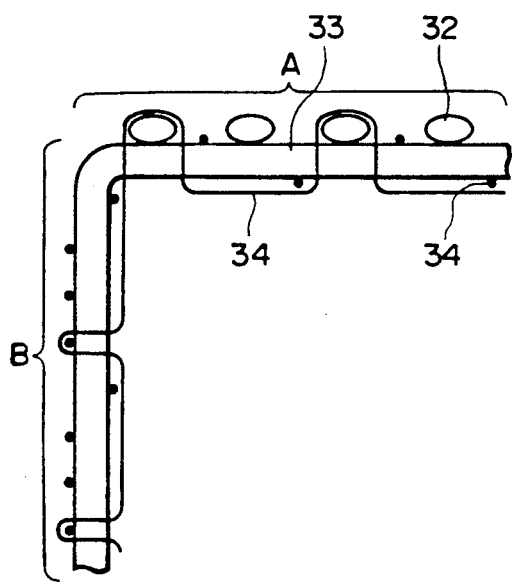
FIG. 10 is an enlarged partial cross-sectional view of the reinforcing woven fabric shown in FIG. 9, when the woven fabric is formed for use in a preformed material.

FIG. 9 illustrates a reinforcing woven fabric according to a second embodiment of the present invention. In this embodiment, the reinforcing woven fabric is formed as a woven fabric 31 having a non-crimp fibrous structure. In the non-crimp fibrous structure, warps 32 composed of reinforcing filamentary yarns of carbon fibers which extend substantially straightly and substantially do not have crimps such as ones to which a stress concentrates, and wefts 33 composed of reinforcing filamentary yarns of carbon fibers which extend substantially straightly, are integrated by auxiliary filamentary yarns 34 composed of glass fibers. Each of reinforcing woven fabrics 31 has flanges forming portions A and A and a web forming portion B for forming a beam. Warps 32 are disposed in the flange forming portions A and A, and the warps are not disposed in the web forming portion B in this embodiment. Therefore, the web forming portion B is formed by only wefts 33 and auxiliary filamentary yarns 34. A part of the single layer of the reinforcing woven fabric in a preformed material is formed as shown in FIG. 10. Flange forming portion A is reinforced by warps 32, and web forming portion B is reinforced by wefts 33 intersecting each other by constituting a lamination structure similar to that shown in FIG. 8.

Figure 11:
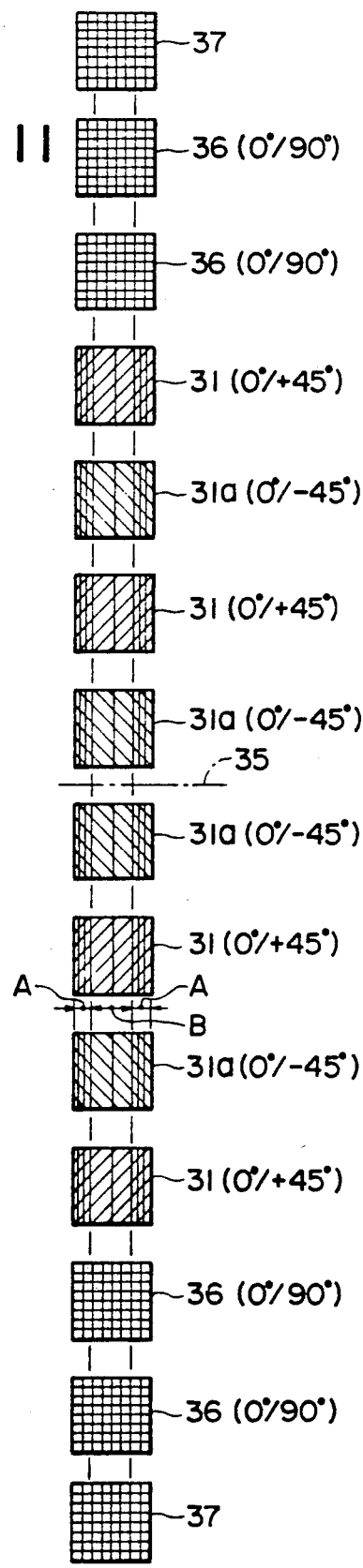
FIG. 11 is a schematic exploded plan view of a preformed material formed with a plurality of the reinforcing woven fabrics shown in FIG. 9.

The lamination of reinforcing woven fabrics 31 for forming a preformed material is preformed, for example, as shown in FIG. 11. In the example shown in FIG. 11, reinforcing woven fabrics 31 each having the warps 32 extending in 0° direction (the longitudinal direction of the preformed material) and the wefts 33 extending in ±45° direction and reinforcing woven fabrics 31a each having the warps 32 extending in 0° direction and the wefts 33 extending in −45° direction are laminated by four sheets on each side of a center surface 35 of the lamination at mirror symmetry relative to the center surface. Center surface 35 is a central plane of lamination which divides the plurality of reinforcing woven fabrics 31, 31a into two groups, each group having the same number of reinforcing woven fabrics as the other group. Two 0°/90° reinforcing woven fabrics 36 composed of carbon fibers are further laminated on each of the outermost surfaces of this bias lamination consisting of eight layers to increase the strength of a fiber reinforced composite material. Further more, because the above reinforcing woven fabrics composed of carbon fibers have a conductivity, a scrim cloth 37 composed of glass fibers is provided on each of the outermost layers to give a electrocorrosion resistance to the surfaces of a fiber reinforced composite material. In the lamination, a 0°/90°, 0° or 90° reinforcing woven fabric may be disposed at a position corresponding to the position of center surface 35. Moreover, preferably the same even number of reinforcing woven fabrics 31 and 31a are laminated from the center surface 35 in opposite lamination directions to maintain the strength balance in different directions.

Figure 12:
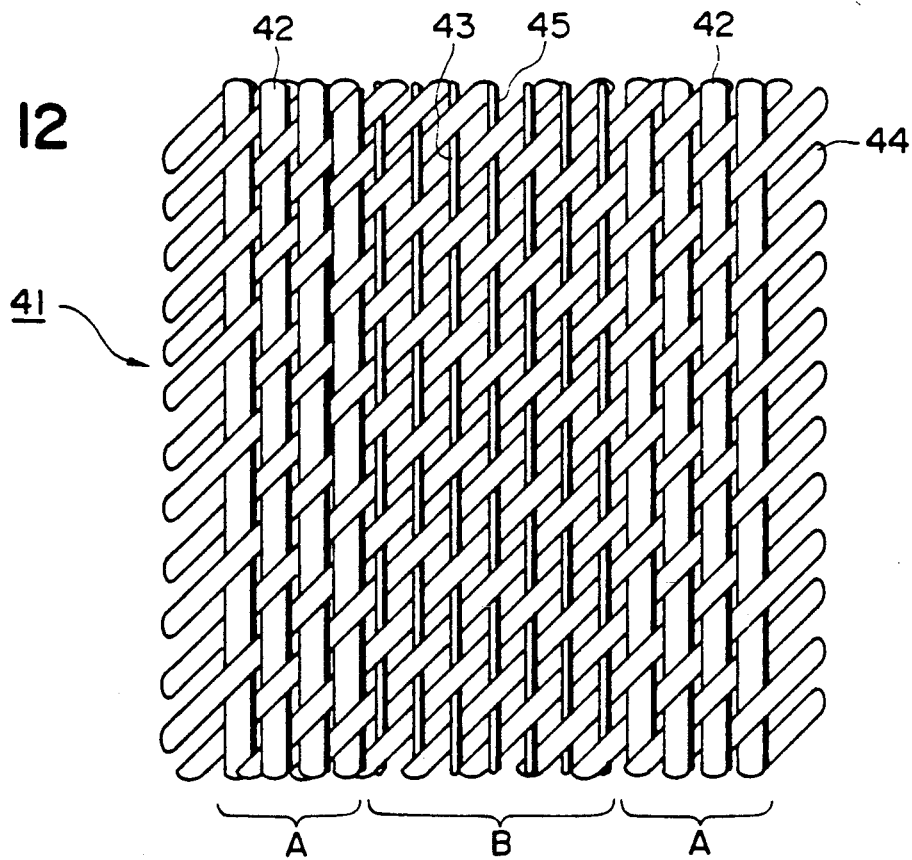
FIG. 12 is a plan view of a reinforcing woven fabric according to a third embodiment of the present invention.
Figure 13:
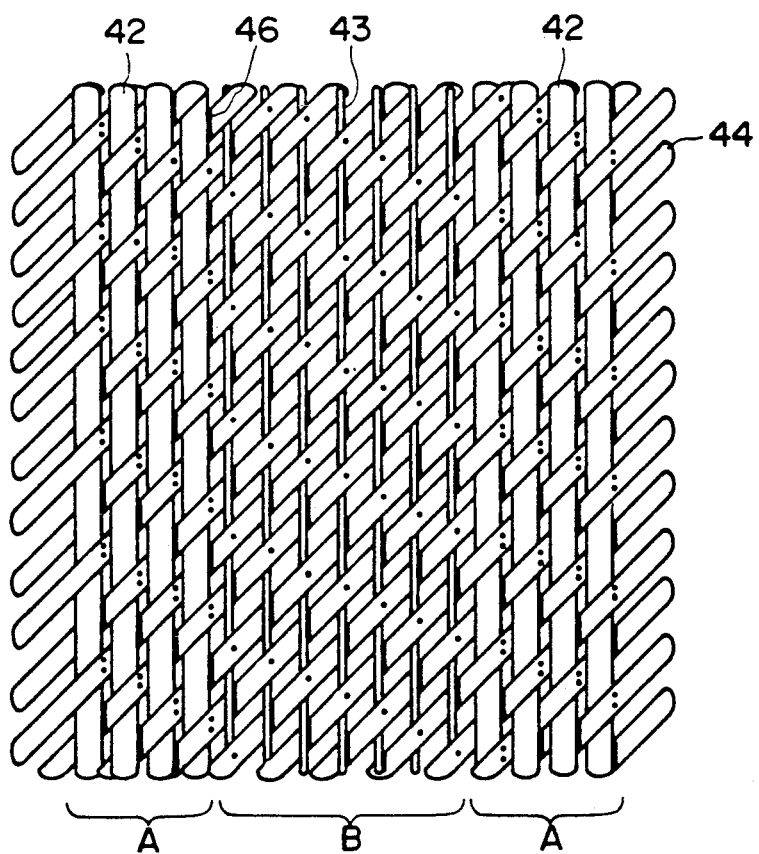
FIGS. 13 to 16 are plan views of modifications of the reinforcing woven fabric shown in FIG. 12.

FIG. 12 illustrates a reinforcing woven fabric 41 according to a third embodiment of the present invention. In the reinforcing woven fabric 41, warps 42 and 43 and wefts 44 are fixed to each other at their intersection by a bonding material 45 of a thermoplastic polymer. This fixing is conducted in a manner that thermoplastic polymer yarns are supplied together with warps 42 and 43 when the fabric is woven, the thermoplastic polymer yarns are molten after the weaving, and the warps and wefts 44 are bonded to each other by the molten thermoplastic polymer yarns. Although bonding materials 45 of a thermoplastic polymer extend continuously in this embodiment, they may be bonding materials 46 extending intermittently as shown in FIG. 13. Further, the bonding materials 45 or 46 may be disposed along every second warp 42 or 43 or every several number of the warp. As long as warps 42 and 43 and wefts 44 can maintain the weave structure, any disposition of the bonding materials is available.

Figure 14:
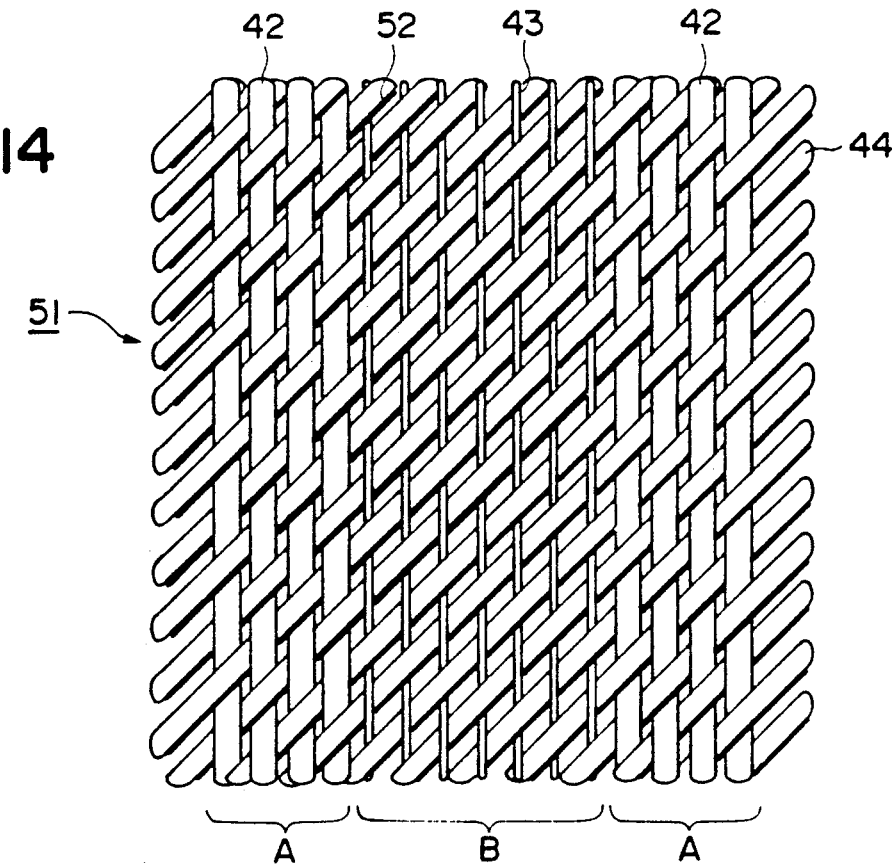
Figure 15:
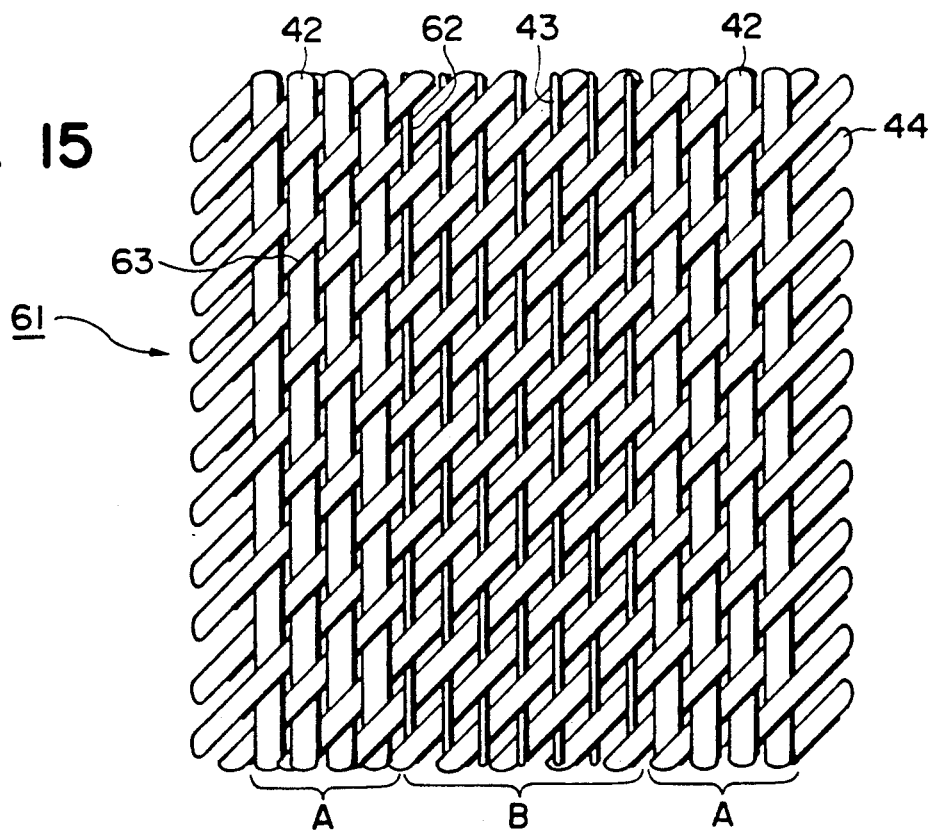
Figure 16:
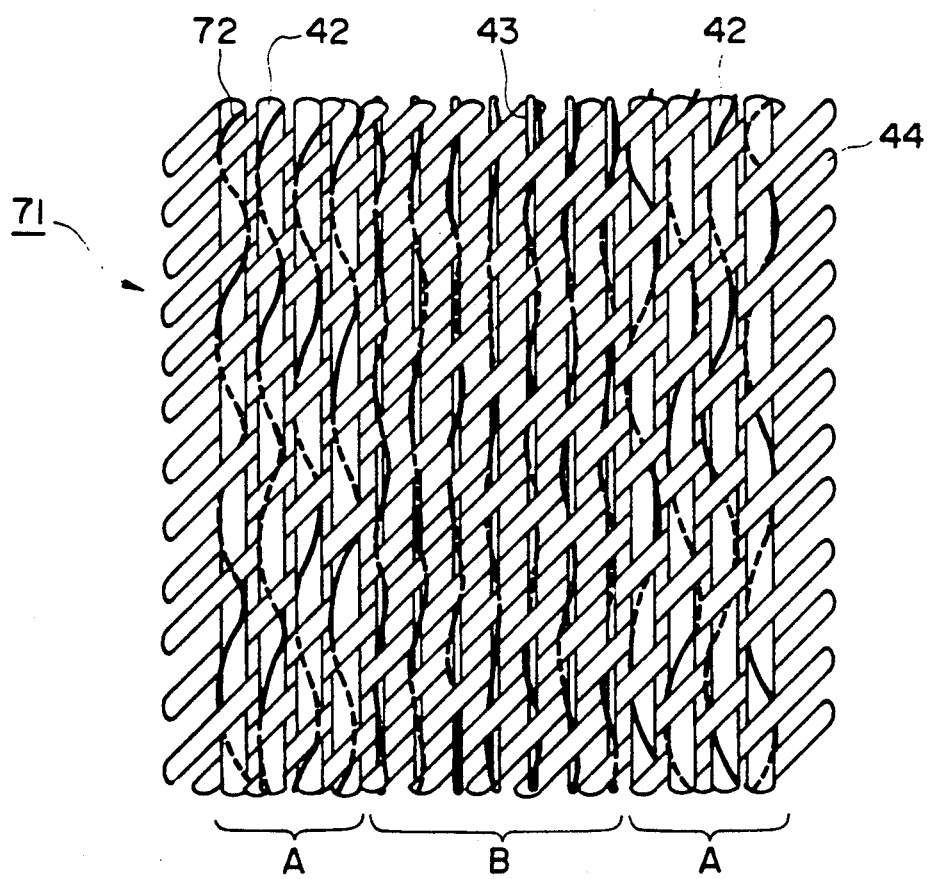

Furthermore, the disposition and the extension of the bonding materials can be variously modified. In a reinforcing woven fabric 51 shown in FIG. 14, bonding materials 52 of a thermoplastic polymer extend along wefts 44. In a reinforcing woven fabric 61 shown in FIG. 15, bonding materials 62 and 63 of a thermoplastic polymer extend along both warps 42 and 43 and wefts 44. In a reinforcing woven fabric 71 shown in FIG. 16, bonding materials 72 of a thermoplastic polymer extend along warps 42 and 43 so as to spirally wind around the warps. The bonding material 72 may extend along both the warps and the wefts. Also in the embodiment shown in FIGS. 14 to 16, bonding materials 52, 62 and 63, or 72 may extend intermittently and may be disposed along every second warp 42 and 43 or weft 44 or every several number of the warps or the weft.

The preformed material according to the present invention can be used for molding various fiber reinforced composite materials, particularly is suitable for molding beams.

Figure 17:
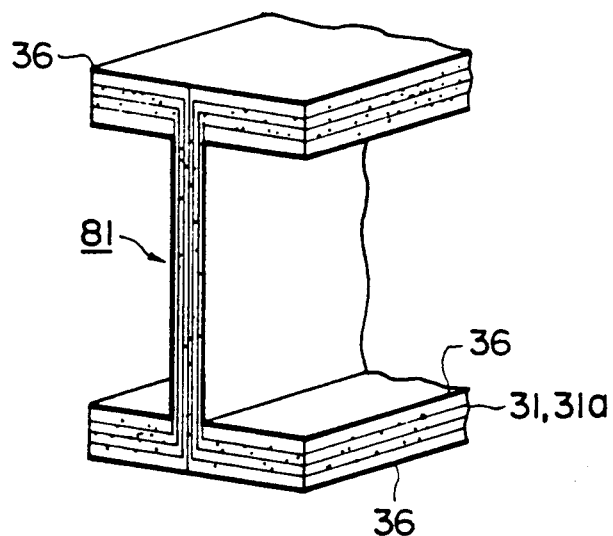
FIG. 17 is a partial perspective view of a beam according to an embodiment of the present invention.
Figure 18:
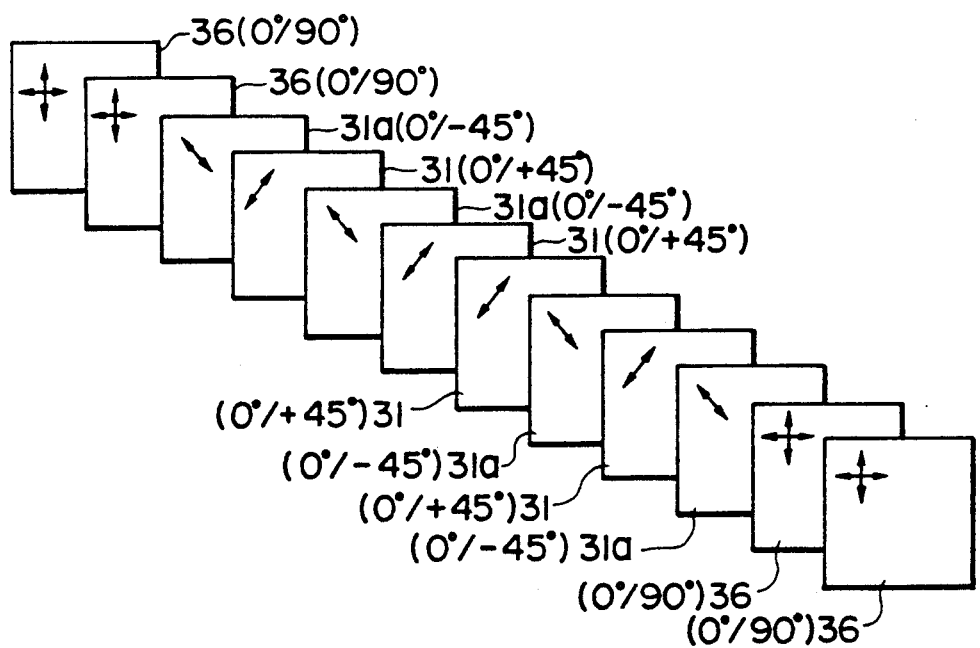
FIG. 18 is an exploded perspective view of a lamination for a preformed material for use in the beam shown in FIG. 17.

FIGS. 17 and 18 illustrate an I-shaped or H-shaped beam and an example of the lamination structure for forming a preformed material for the beam. For example, as shown in FIG. 18, a preformed material is formed using the same reinforcing woven fabrics 31 and 31a as those shown in FIG. 11, the 0°/±45° reinforcing woven fabrics 31 and the 0°/−45° reinforcing woven fabrics 31a are laminated at mirror symmetry relative to the center surface of the lamination, and two sheets of 0°/90° reinforcing woven fabrics 36 are laminated as each outermost layer. This lamination material is opened at its end portions to form an I shape or H shape, and 0°/90° reinforcing woven fabrics are further laminated on the top surface and the bottom surface of the opened portions of the lamination material. Thus, a preformed material for a beam 81 shown in FIG. 17 can be made. The beam 81 is molded by impregnating a required resin or metal into the preformed material.

Figure 19:
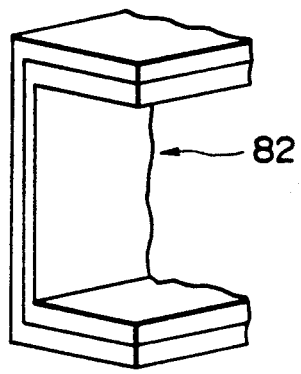
FIGS. 19 to 22 are partial perspective views of beams according to other embodiments of the present invention.
Figure 20:
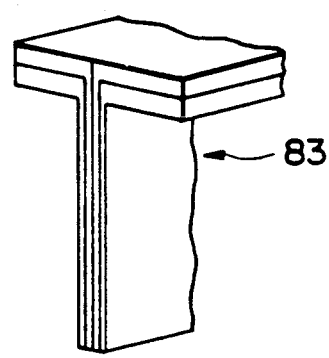
Figure 21:
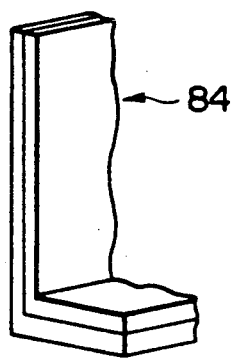
Figure 22:
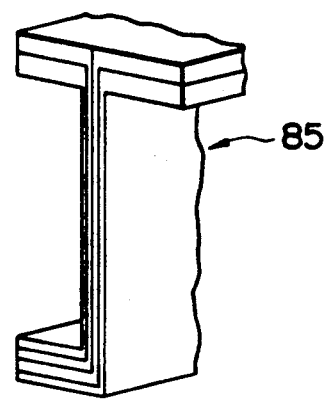

With respect to the shape of the beam, various shapes other than Z shape, I shape and H shape described hereinabove can be employed. For example, a C-shaped beam 82 shown in FIG. 19, a T-shaped beam 83 shown in FIG. 20, an L-shaped beam 84 shown in FIG. 21 and a J-shaped beam 85 shown in FIG. 22 can be molded as needed.

Figure 23:
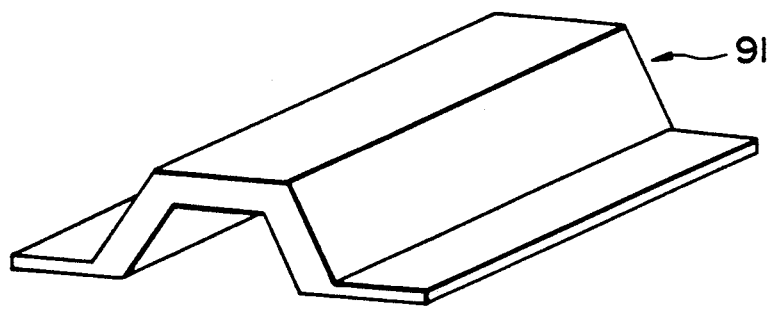
FIGS. 23 to 25 are perspective views of structural members to which fiber reinforced composite materials according to the present invention can be applied.
Figure 24:
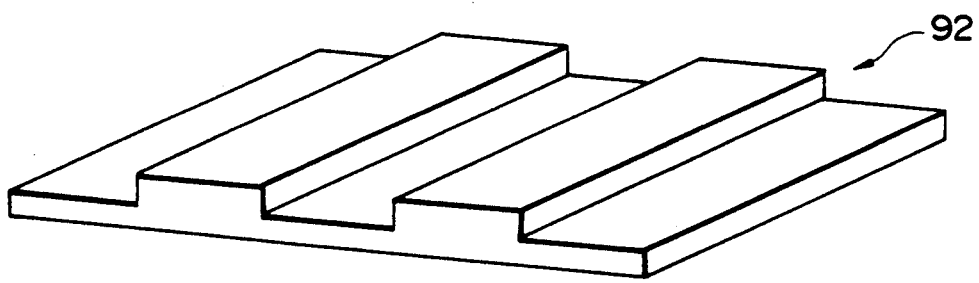
Figure 25:
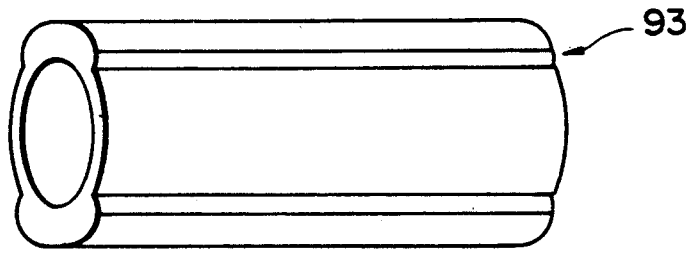

Further, the fiber reinforced composite material according to the present invention can be applied to various structural members requiring a high strength other than beams. For example, a stiffener 91 shown in FIG. 23, an irregular plate 92 shown in FIG. 24 and a cylindrical structural member 93 shown in FIG. 25 can be molded.

Figure 26:
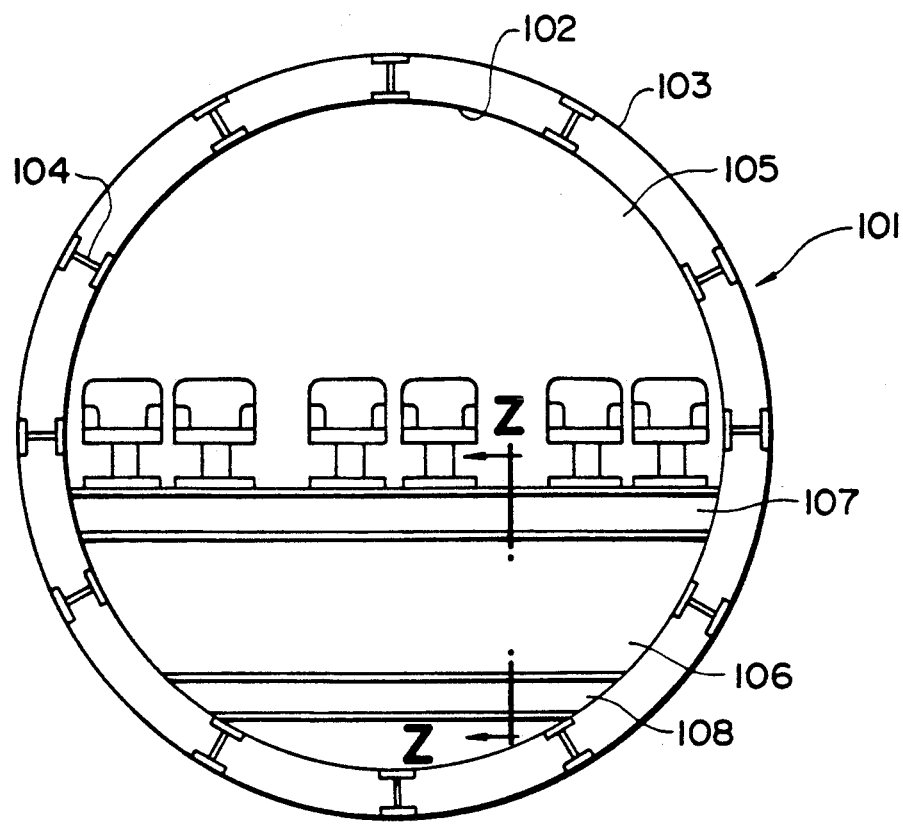
FIG. 26 is a cross-sectional view of a body of an airplane to which beams according to the present invention are applied.
Figure 27:
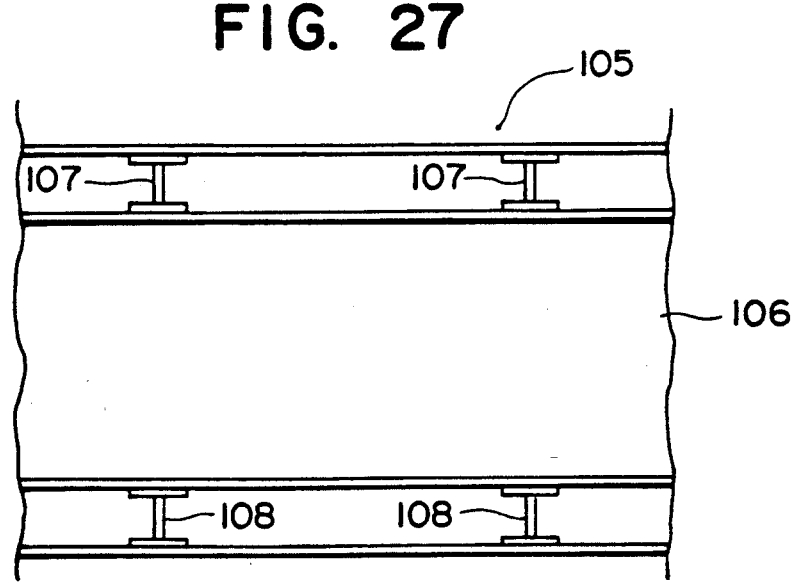
FIG. 27 is an enlarged partial vertical sectional view of the body shown in FIG. 26, taken along Z—Z line of FIG. 26.

The fiber reinforced composite material according to the present invention is suitable for beams, particularly the beams required to have the properties of a light weight and a high strength, such as the beams or the frame members used in airplanes, ships or vehicles. For instance, FIGS. 26 and 27 shown an example wherein the fiber reinforced composite material according to the present invention is applied to the beams used in a body 101 of an airplane. The body 101 is formed as a double body construction comprising an inner body 102 and an outer body 103. The beams similar to that shown in FIG. 17 according to the present invention can be applied to beams 104 disposed between inner body 102 and outer body 103, beams 107 disposed between a cabin 105 and a cargo room 106 and beams 108 disposed under the floor of the cargo room.

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A reinforcing woven fabric for use in fiber reinforced composite materials comprising:

a plurality of warps of reinforcing filamentary yarns extending in a longitudinal direction of said reinforcing woven fabric in parallel to one another in a sheet-like form, said warps being arranged in a transverse direction of said reinforcing woven fabric to form a portion with a high density of said warps and a portion with a low density of said warps, said sheet-like form having a central portion and two side portions in said transverse direction, said central portion being formed as said low density portion of the warps and at least one of said side portions being formed as said high density portion of the warps, said warps of the low density portion and said warps of the high density portion being grouped respectively, said warps of the high density portion having a yarn size larger than a yarn size of said warps of the low density portion; and a plurality of wefts of reinforcing filamentary yarns extending in a direction across said warps and oblique to said longitudinal direction of extension of said warps in parallel to one another in a sheet-like form.

2. The reinforcing woven fabric according to claim 1, wherein said reinforcing filamentary yarns of said warps and wefts are high-strength and high Young's modulus multifilaments composed of at least one member selected from the group consisting of carbon fibers, glass fibers, polyaramide fibers, polyetheretherketone fibers, silicon carbide fibers, alumina fibers and alumina-silica fibers.

3. The reinforcing woven fabric according to claim 1, wherein said warps and wefts are woven as a plain weave, twill weave or satin weave structure.

4. The reinforcing woven fabric according to claim 1, wherein said warps and wefts are held integrally by auxiliary filamentary yarns to form a non-crimp fibrous structure.

5. The reinforcing woven fabric according to claim 4, wherein said auxiliary filamentary yarns are composed of at least one member selected from the group consisting of carbon fibers, glass fibers, polyaramide fibers, rayon fibers, acrylic fibers, polypropylene fibers, polyamide fibers and polyester fibers, and said auxiliary filamentary yarns have an elongation at break higher than those of both said warps and wefts.

6. The reinforcing woven fabric according to claim 1, wherein said wefts extend obliquely to said warps at an angle in the range of 45°±15°.

7. The reinforcing woven fabric according to claim 6, wherein said wefts extend obliquely to said warps at an angle of 45°.

8. The reinforcing woven fabric according to claim 1, wherein said warps and wefts and adhered to each other by a thermoplastic polymer at their intersection.

9. The reinforcing woven fabric according to claim 8, wherein said thermoplastic polymer is selected from the group consisting of nylon, copolymerized nylon, polyester, vinylidene chloride polymer and vinyl chloride polymer.

10. The reinforcing woven fabric according to claim 1, wherein said portion with a high density of said warps is formed by a double weave structure.

11. The reinforcing woven fabric according to claim 1, wherein said portion with a high density of said warps has a density of said warps of at least three times that of said portion with a low density of said warps.

12. The reinforcing woven fabric according to claim 1, further comprising a substance which acts as a matrix, and which is added to said reinforcing woven fabric in order to form a prepreg.

13. The reinforcing woven fabric according to claim 12, wherein said substance which acts as a matrix is a resin which impregnates said reinforcing woven fabric.

14. The reinforcing woven fabric according to claim 12, wherein said substance which acts as a matrix is a layer of metal which is provided onto a surface of said reinforcing woven fabric.

15. A preformed material for use in fiber reinforced composite materials, said preformed material having a plurality of reinforcing woven fabrics laminated and integrated to each other, each of said reinforcing woven fabrics comprising (a) a plurality of warps of reinforcing filamentary yarns extending in a longitudinal direction of said reinforcing woven fabric in parallel to one another in a sheet-like form, said warps being arranged in a transverse direction of said reinforcing woven fabric to form a portion with a high density of said warps and a portion with a low density of said warps, said sheet-like form having a central portion and two side portions in said transverse direction, said central portion being formed as said low density portion of the warps and at least one of said side portions being formed as said high density portion of the warps, said warps of the low density portion and said warps of the high density portion being grouped respectively, said warps of the high density portion having a yarn size larger than a yarn size of said warps of the low density portion, and (b) a plurality of wefts or reinforcing filamentary yarns extending in a direction across said warps and oblique to said longitudinal direction of extension of said warps in parallel to one another in a sheet-like form; said plurality of reinforcing woven fabrics being so laminated that the portion with said high density of said warps of the respective reinforcing woven fabrics are conformed to each other and the portions with said low density of said warps of the respective reinforcing woven fabrics are conformed to each other.

16. The preformed material according to claim 15, wherein said reinforcing filamentary yarns of said warps and wefts are high-strength and high Young's modulus filaments composed of at least one member selected from the group consisting of carbon fibers, glass fibers, polyaramide fibers, polyetheretherketone fibers, silicon carbide fibers, alumina fibers and alumina-silica fibers.

17. The preformed material according to claim 15, wherein said warps and wefts are woven as a plain weave, twill weave or satin weave structure.

18. The preformed material according to claim 15, wherein said warps and wefts are held integrally by auxiliary filamentary yarns to form a non-crimp fibrous structure.

19. The preformed material according to claim 18, wherein said auxiliary filamentary yarns are composed of at least one member selected from the group consisting of carbon fibers, glass fibers, polyaramide fibers, rayon fibers, acrylic fibers, polypropylene fibers, polyamide fibers and polyester fibers, and said auxiliary filamentary yarns have an elongation at break higher than those of both said warps and wefts.

20. The preformed material according to claim 15, wherein said wefts extend obliquely to said warps at an angle in the range of 45°±15°.

21. The preformed material according to claim 15, wherein said wefts extend obliquely to said warps at an angle of 45°.

22. The preformed material according to claim 15, wherein said warps and wefts are adhered to each other by a thermoplastic polymer at their intersections.

23. The preformed material according to claim 22, wherein said thermoplastic polymer is selected from the group consisting of nylon, copolymerized nylon, polyester, vinylidene chloride polymer and vinyl chloride polymer.

24. The preformed material according to claim 15, wherein said portion with a high density of said warps has a density of said warps of at least three times that of said portion with a low density of said warps.

25. The preformed material according to claim 15, wherein said plurality of reinforcing woven fabrics are laminated such that the directions of extension of said warps and wefts of the respective reinforcing woven fabrics are set at mirror symmetry relative to a central plane of lamination of said plurality of reinforcing woven fabrics.

26. The preformed material according to claim 15, wherein said warps and wefts are adhered to each other by a thermoplastic polymer at their intersections, and said plurality of reinforcing woven fabrics are integrated by said thermoplastic polymer.

27. The preformed material according to claim 15, wherein said thermoplastic polymer is selected from the group consisting of nylon, copolymerized nylon, polyester, vinylidene chloride polymer and vinyl chloride polymer.

28. The preformed material according to claim 15, wherein said plurality of reinforcing woven fabrics are integrated by stitching by stitch yarns which are reinforcing filamentary yarns composed of at least one member selected from the group consisting of carbon fibers, glass fibers, polyaramide fibers, polyetheretherketone fibers, silicon carbide fibers, alumina fibers and alumina-silica fibers, and having an elongation at break higher than those of both said warps and wefts.

29. The preformed material according to claim 28, wherein said stitching is a single chain stitching.

30. The preformed material according to claim 15, wherein said preformed material is a preformed material having a flange forming portion and a web forming portion for use in a beam, and said plurality of reinforcing woven fabrics are such laminated that the portions with said high density of said warps of the respective reinforcing woven fabrics are positioned at said flange forming portion, said warps of the respective reinforcing woven fabrics extend in said flange forming portion in the longitudinal direction of said beam and the portions with said low density of said warps of the respective reinforcing woven fabrics are positioned at said web forming portion.

31. The preformed material according to claim 30, wherein said preformed material has a H-shaped, I-shaped, C-shaped, J-shaped, L-shaped, T-shaped or Z-shaped cross section.

32. The preformed material according to claim 15, further comprising a substance which acts as a matrix, and which is added to said reinforcing woven fabric in order to form a prepreg.

33. The preformed material according to claim 32, wherein said substance which acts as a matrix is a resin which impregnates said reinforcing woven fabric.

34. The preformed material according to claim 32, wherein said substance which acts as a matrix is a layer of metal which is provided onto a surface of said reinforcing woven fabric.

35. A fiber reinforced composite material including a preformed material comprised of a plurality of reinforcing woven fabrics laminated and integrated to each other and a matrix containing said plurality of reinforcing woven fabrics comprising (a) a plurality of warps of reinforcing filamentary yarns extending in a longitudinal direction of said reinforcing woven fabric in parallel to one another in a sheet-like form, said warps being arranged in a transverse direction of said reinforcing woven fabric to form a portion with a high density of said warps and a portion with a low density of said warps, said sheet-like form having a central portion and two side portions in said transverse direction, said central portion being formed as said low density portion of the warps and at least one of said side portions being formed as said high density portion of the warps, said warps of the low density portion and said warps of the high density portion being grouped respectively, said warps of the high density portion having a yarn size larger than a yarn size of said warps of the low density portion and (b) a plurality of wefts of reinforcing filamentary yarns extending in a direction across said warps and oblique to said longitudinal direction of extension of said warps in parallel to one another in a sheet-like form; said plurality of reinforcing woven fabrics being so laminated that the portions with said high density of said warps of the respective reinforcing woven fabrics are conformed to each other and the portions with said low density of said warps of the respective reinforcing woven fabrics are conformed to each other.

36. The fiber reinforced composite material according to claim 35, wherein said reinforcing filamentary yarns of said warps and wefts are high-strength and high Young's modulus multifilaments composed of at least one member selected from the group consisting of carbon fibers, glass fibers, polyaramide fibers, polyetheretherketone fibers, silicon carbide fibers, alumina fibers and alumina-silica fibers.

37. The fiber reinforced composite material according to claim 35, wherein said warps and wefts are woven as a plain weave, twill weave or satin weave structure.

38. The fiber reinforced composite material according to claim 35, wherein said warps and wefts are held integrally by auxiliary filamentary yarns to form a noncrimp fibrous structure.

39. The fiber reinforced composite material according to claim 38, wherein said auxiliary filamentary yarns are composed of at least one member selected from the group consisting of carbon fibers, glass fibers, polyaramide fibers, rayon fibers, acrylic fibers, polypropylene fibers, polyamide fibers and polyester fibers, and said auxiliary filamentary yarns have an elongation at break higher than those of both said warps and wefts.

40. The fiber reinforced composite material according to claim 35, wherein said wefts extend obliquely to said warps at an angle in the range of 45°±15°.

41. The fiber reinforced composite material according to claim 40, wherein said wefts extend obliquely to said warps at an angle of 45°.

42. The fiber reinforced composite material according to claim 35, wherein said warps and wefts are adhered to each other by a thermoplastic polymer at their intersections.

43. The fiber reinforced composite material according to claim 42, wherein said thermoplastic polymer is selected from the group consisting of nylon, copolymerized nylon, polyester, vinylidene chloride polymer and vinyl chloride polymer.

44. The fiber reinforced composite material according to claim 35, wherein said portion with a high density of said warps is present at least at one side end portion of said reinforcing woven fabric in the transverse direction of said reinforcing woven fabric.

45. The fiber reinforced composite material according to claim 35, wherein said portion with a high density of said warps is formed by a double weave structure.

46. The fiber reinforced composite material according to claim 35, wherein said portion with a high density of said warps has a density of said warps of at least three times that of said portion with a low density of said warps.

47. The fiber reinforced composite material according to claim 35, wherein said plurality of reinforcing woven fabrics are laminated such hat the directions of extension of said warps and wefts of the respective reinforcing woven fabrics are set at mirror symmetry relative to a central plane of lamination of said plurality of reinforcing woven fabrics.

48. The fiber reinforced composite material according to claim 35, wherein said warps and wefts are fixed to each other by a thermoplastic polymer at their intersections, and said plurality of reinforcing woven fabrics are integrated by said thermoplastic polymer.

49. The fiber reinforced composite material according to claim 48, wherein said thermoplastic polymer is selected from the group consisting of nylon, copolymerized nylon, polyester, vinylidene chloride polymer and vinyl chloride polymer.

50. The fiber reinforced composite material according to claim 35, wherein said plurality of reinforcing woven fabrics are integrated by stitching by stitch yarns which are reinforcing filamentary yarns composed of at least one member selected from the group consisting of carbon fibers, glass fibers, polyaramide fibers, polyetheretherketone fibers, silicon carbide fibers, alumina fibers and alumina-silica fibers, and having an elongation at break higher than those of both said warps and wefts.

51. The fiber reinforced composite material according to claim 50, wherein said stitching is a single chain stitching.

52. The fiber reinforced composite material according to claim 35, wherein said matrix is a resin.

53. The fiber reinforced composite material according to claim 35, wherein said matrix is a carbon-containing material.

54. The fiber reinforced composite material according to claim 35, wherein said matrix is a metal.

55. A beam constructed from a fiber reinforced composite material, said beam having a flange and a web, said fiber reinforced composite material including a preformed material comprised of a plurality of reinforcing woven fabrics laminated and integrated to each other and a matrix containing said plurality of reinforcing woven fabrics; each of said reinforcing woven fabrics comprising (a) a plurality of warps of reinforcing filamentary yarns extending in a longitudinal direction of said reinforcing woven fabric in parallel to one another in a sheet-like form, said warps being arranged in a transverse direction of said reinforcing woven fabric to form a portion with a high density of said warps and a portion with a low density of said warps, said sheet-like form having a central portion and two side portions in said transverse direction, said central portion being formed as said low density portion of the warps and at least one of said side portions being formed as said high density portion of the warps, said warps of the low density portion and said warps of the high density portion being grouped respectively, said warps of the high density portion having a yarn size larger than a yarn size of said warps of the low density portion, and (b) a plurality of wefts of reinforcing filamentary yarns extending in a direction across said warps and oblique to said longitudinal direction of extension of said warps in parallel to one another in a sheet-like form; said plurality of reinforcing woven fabrics being so laminated that the portions with said high density of said warps of the respective reinforcing woven fabrics are conformed to each other and the portions with said low density of said warps of the respective reinforcing woven fabrics are conformed to each other.

56. The beam according to claim 55, wherein said reinforcing filamentary yarns of said warps and wefts are high-strength and high Young's modulus multifilaments composed of at least one member selected from the group consisting of carbon fibers, glass fibers, polyaramide fibers, polyetheretherketone fibers, silicon carbide fibers, alumina fibers and alumina-silica fibers.

57. The beam according to claim 55, wherein said warps and wefts are woven as a plain weave, twill weave or satin weave structure.

58. The beam according to claim 55, wherein said warps and wefts are held integrally by auxiliary filamentary yarns to form a non-crimp fibrous structure.

59. The beam according to claim 58, wherein said auxiliary filamentary yarns are composed of at least one member selected from the group consisting of carbon fibers, glass fibers, polyaramide fibers, rayon fibers, acrylic fibers, polypropylene fibers, polyamide fibers and polyester fibers, and said auxiliary filamentary yarns have an elongation at break higher than those of both said warps and wefts.

60. The beam according to claim 55, wherein said wefts extend obliquely to said warps at an angle in the range of $45° \pm 15°$.

61. The beam according to claim 60, wherein said wefts extend obliquely to said warps at an angle of 45°.

62. The beam according to claim 55, wherein said warps and wefts are adhered to each other by a thermoplastic polymer at their intersections.

63. The beam according to claim 62, wherein said thermoplastic polymer is selected from the group consisting of nylon, copolymerized nylon, polyester, vinylidene chloride polymer and vinyl chloride polymer.

64. The beam according to claim 55, wherein said portion with a high density of said warps is formed by a double weave structure.

65. The beam according to claim 55, wherein said portion with a high density of said warps has a density of said warps of at least three times that of said portion with a low density of said warps.

66. The beam according to claim 55, wherein said plurality of reinforcing woven fabrics are laminated such that the directions of extension of said warps and wefts of the respective reinforcing woven fabrics are set at mirror symmetry relative to a central plane of lamination of said plurality of reinforcing woven fabrics.

67. The beam according to claim 55, wherein said warps and wefts adhered to each other by a thermoplastic polymer at their intersections, and said plurality of reinforcing woven fabrics are integrated by said thermoplastic polymer.

68. The beam according to claim 67, wherein said thermoplastic polymer is selected from the group consisting of nylon, copolymerized nylon, polyester, vinylidene chloride polymer and vinyl chloride polymer.

69. The beam according to claim 55, wherein said plurality of reinforcing woven fabrics are integrated by stitching by stitch yarns which are reinforcing filamentary yarns composed of at least one member selected from the group consisting of carbon fibers, glass fibers, polyaramide fibers, polyetheretherketone fibers, silicon carbide fibers, alumina fibers and alumina-silica fibers, and having an elongation at break higher than those of both said warps and wefts.

70. The beam according to claim 69, wherein said stitching is a single chain stitching.

71. The beam according to claim 55, wherein said matrix is a resin.

72. The beam according to claim 55, wherein said beam has a H-shaped, I-shaped, C-shaped, J-shaped, L-shaped, T-shaped or Z-shaped cross section.

73. The beam according to claim 55, wherein said matrix is a carbon-containing material.

74. The beam according to claim 55, wherein said matrix is a metal.

* * * * *